United States Patent Office

Re. 27,424
Reissued July 4, 1972

27,424

ZINC BORATE OF LOW HYDRATION AND METHOD FOR PREPARING SAME

Nelson P. Nies, Laguna Beach, and Richard W. Hulbert, Garden Grove, Calif., assignors to United States Borax & Chemical Corporation, Los Angeles, Calif.

No Drawing. Original No. 3,549,316, dated Dec. 22, 1970, Ser. No. 648,968, June 26, 1967. Application for reissue May 18, 1971, Ser. No. 144,659
Int. Cl. C01b *25/00*
U.S. Cl. 23—59 11 Claims

Matter enclosed in heavy brackets [ ] appears in the original patent but forms no part of this reissue specification; matter printed in italics indicates the additions made by reissue.

ABSTRACT OF THE DISCLOSURE

A crystalline zinc borate having the approximate composition $2ZnO \cdot 3B_2O_3 \cdot 3.5H_2O$, and the preparation of the zinc borate. Preparation of the zinc borate is accomplished by reacting boric acid and an inorganic zinc compound in an aqueous medium at temperatures above about 70° C.

The compound of the present invention contains much less water of hydration than previous hydrated zinc borates. Because it contains less water of hydration, the new zinc borate presents great advantages in shipping. Proportionately, more zinc borate may be shipped, for the same weight, of the present zinc borate.

The zinc borate of the present invention has a decided advantage as addition agent to polymers. Since the new zinc borate contains less water of hydration, it loses less water when added to polymers at high temperatures. Therefore, there is less tendency for voids to form in the plastic. Also, it decomposes, losing water, at a much higher temperature than the previously known hydrate zinc borates, which is a distinct advantage when mixed with a hot polymer batch.

The zinc borate of the present invention is prepared by dissolving borax and/or boric acid in water, adding zinc oxide or a solution of sulfuric acid containing zinc oxide, or a solution of zinc sulfate or other zinc salt, heating to at least about 70° C. for a period of time, followed by separation of the resultant desired zinc borate of the present invention by filtration and the like.

Previously, zinc borate has been produced by forming a solution of borax and zinc sulfate and thereafter introducing finely divided zinc oxide or forming zinc oxide in situ by the addition of sodium hydroxide. The sodium hydroxide reacts with the zinc sulfate which must therefore be present in excess to form zinc oxide. The resultants in turn react to form zinc borates. Zinc borate has then been crystallized at room temperature according to the patent to Myhren et al., No. 2,405,366. A zinc borate of the composition $2ZnO \cdot 3B_2O_3 \cdot 7H_2O$ is produced. According to the Blair et al., Pat. No. 3,126,352, a zinc borate gel was prepared by combining a borax solution and a zinc sulfate solution, both of which had been cooled from 68° C. to 32° C. before mixing. At this low temperature, 32° C., a crystalline product is not produced. Rather, a gel of high hydration was produced.

For a better understanding of the concept underlying the invention, Examples I and II are set forth to illustrate prior art products and Examples III to VII are set forth to illustrate methods for accomplishing the results of the instant invention:

EXAMPLE I

A solution was prepared containing 252 grams of borax pentahydrate, 541 grams of boric acid, and 3,500 milliliters of water. A solution of 71.4 grams of zinc oxide, 87 grams of 96% sulfuric acid, and 520 milliliters of water was also prepared. The solutions were mixed slowly together. The solutions were seeded, after mixing, with 5.5 grams of previously known zinc borate crystals. The mixed solutions were stirred overnight while being maintained at 40° C. The crystals formed were removed by filtration and then washed with water and acetone. An X-ray diffraction pattern of the crystals was the same as that found in a commercially available zinc borate which has the approximate analysis $2ZnO \cdot 3B_2O_3 \cdot 9H_2O$.

EXAMPLE II

Solutions were prepared as in Example I. 0.5 gram of seed crystal were used. After mixing, the solutions were stirred overnight at 62° C. The formed crystals were filtered from the liquor, mixed in about 500 milliliters of cold water, refiltered and then washed with water. A product having the formula $2ZnO \cdot 3.26B_2O_3 \cdot 9.52H_2O$ was obtained. X-ray diffraction shows a pattern similar to that of Example I.

EXAMPLE III

The solutions were prepared as in Examples I and II. 0.5 gram seed crystal from Example I was added. However, the mixtures were stirred overnight at 96° C. and then cooled to 90° C. before filtration. The resulting crystals were washed with water and with acetone. The formula of the zinc borate obtained was $$2.06ZnO \cdot 3B_2O_3 \cdot 3.59H_2O$$

The X-ray diffraction pattern was different from published patterns and the pattern of Examples I and II. The crystals were irregular and diamond shape. The size ranged from very small up to about 6 x 10 microns.

Different X-ray diffraction patterns are obtained from the new zinc borate than are obtained from the ordinary zinc borate. The X-ray diffraction patterns of ordinary zinc borate are found on ASTM cards 9–88 and 11–279. The X-ray diffraction pattern is a table of the interplanar spacings in Angstrom units on a film or spectrometer chart and the relative intensities of the lines. The technique employed is of the type found in X-ray Diffraction Procedures, Harold P. Klug and Leroy E. Alexander (1954), page 235 et seq.

The X-ray powder pattern of the new zinc borate as produced by Example III is as follows:

| d A | $I/I_1$ | d A | $I/I_1$ |
|---|---|---|---|
| 5.48 | 11 | 2.60 | 14 |
| 5.00 | 70 | 2.496 | 23 |
| 4.90 | 100 | 2.473 | 19 |
| 4.31 | 81 | 2.446 | 55 |
| 4.08 | 78 | 2.10 | 32 |
| 3.95 | 21 | 2.045 | 16 |
| 3.75 | 70 | 1.98 | 21 |
| 3.69 | 40 | 1.966 | 27 |
| 3.45 | 59 | 1.94 | 11 |
| 3.23 | 26 | 1.869 | 23 |
| 3.10 | 64 | 1.808 | 25 |
| 2.95 | 51 | 1.73 | 15 |
| 2.91 | 44 | 1.667 | 11 |
| 2.85 | 15 | 1.6295 | 15 |
| 2.79 | 11 | 1.613 | 15 |
| 2.725 | 26 | 1.585 | 14 |

EXAMPLE IV

A solution containing 252 grams borax, 541 grams boric acid, and 3,500 milliliters of water was prepared at 95° C. A solution containing 126 grams of zinc chloride in 500 millilters of water was also prepared. The solutions were mixed and seeded with one-half grams of crystal from Example III. The mixture was stirred overnight at 100° C. It was then cooled to 95° C. and filtered. The crystals were washed with water and acetone, as before. The analysis of the resulting zinc borate was 07ZnO·$3B_2O_3$·$3.71H_2O$. The X-ray diffraction pattern similar to that of Example III. The crystals were regular and diamond shaped and ranged in size from ery small to about 3 x 20 microns.

EXAMPLE V

Solutions were prepared as in Example IV. The solu-ons were mixed and stirred overnight at 99° C. The ixture was then cooled to 90° C. and filtered. The ystals were washed with water and then with acetone. he analysis of the product resulting from this process as 2.05ZnO·$3B_2O_3$·$3.58H_2O$. The crystals were diamond aped and irregular, and ranged in size from very small p to 8 x 17 microns. The X-ray diffraction was similar to at of Example III.

EXAMPLE VI

To 3400 grams of boiling water in a flask was added 00 grams of boric acid. The solution was agitated and eated at about 95° C. Twenty grams of previously pre-ared crystals of 2ZnO·$3B_2O_3$·$3.5H_2O$ were added as ed. A mixture of 371 grams of boric acid and 162.8 rams of zinc oxide was then added gradually over a eriod of about one hour. The mixture was stirred at bout 95° C. overnight and the crystals then removed y filtration, washed with methanol and dried. The crys-ls analyzed 37.98% ZnO, 47.13% $B_2O_3$ and 14.89% $_2O$ (by difference), corresponding to a ratio 2.07ZnO·$3B_2O_3$·$3.66H_2O$ he X-ray diffraction pattern was the same as the previ-usly prepared 2ZnO·$3B_2O_3$·$3.5H_2O$ of Example III.

EXAMPLE VII

In a closed agitated flask, 900 grams of boric acid was issolved in 5100 grams of water at 75° C. The follow-ng were then added, in order:

0 grams of 2ZnO·$3B_2O_3$·$3.5H_2O$ crystals as seed;
mixture of 162.8 grams of zinc oxide and 510 grams of water;
61 grams of boric acid.

he mixture was stirred at 75° C. for 20 hours; the olids were then separated by a Buchner filter, washed vith methanol and dried. The X-ray diffraction pattern f the product was the same as the product of Example II. Analysis: 2.04ZnO·$3B_2O_3$·$3.51H_2O$.

Since the water content of the compound is determined y difference, the analysis can fall within the range of rom about 3.3 to $3.7H_2O$. However, the water of hy-ration appears to be about $3.5H_2O$ for the pure com-ound.

The zinc borates are commonly used as fire retardants. he zinc borate of this invention is particularly useful, ince it carries a small amount of water of hydration, hus reducing the difficulties attendant with release of the vater when the fire retardant is added to various com-ositions, particularly plastics. The zinc borates of the resent invention are also useful as fungicides.

What is claimed is:

1. A composition of matter comprising a crystalline zinc borate of the approximate formula 2ZnO·$3B_2O_3$ wherein water of hydration is present in a range of $3.3H_2O$ to $3.7H_2O$.

2. The zinc borate of claim 1 wherein the water of hydration is about $3.5H_2O$.

3. The process of preparing zinc borate of the approximate formula 2ZnO·$3B_2O_3$ wherein water of hydration is present in a range of $3.3H_2O$ to $3.7H_2O$ comprising mixing boric acid *and borax* with an inorganic zinc compound in the presence of zinc borate seed crystals and in the presence of an aqueous medium and maintaining a temperature of at least about 70° C. whereby the said zinc borate is precipitated.

[4. The process of claim 3 in which borax is also present as a reactant.]

5. The process of claim 3 wherein said zinc compound is selected from the group consisting of ZnO, $ZnSO_4$ and $ZnCl_2$.

6. The process of claim 3 wherein said zinc compound is zinc chloride.

7. The process of claim 3 wherein said zinc compound is zinc sulfate.

8. The process of claim 3 wherein said zinc compound is zinc oxide.

9. The process of claim 3 wherein said reaction takes place at a temperature between 90° C. and 100° C.

10. The process of preparing zinc borate of the approximate formula 2ZnO·$3B_2O_3$ wherein water of hydration is present in a range of $3.3H_2O$ to $3.7H_2O$, comprising reacting borax and boric acid in an aqueous medium with zinc sulfate in the presence of zinc borate seed crystal, the said zinc sulfate being prepared in situ by the reaction of zinc oxide and sulfuric acid, at a temperature of at least about 70° C. whereby the said zinc borate is precipitated.

11. The process of claim 9 wherein said reaction takes place at a temperature between 90° C. and 100° C.

[12. The process of claim 9 wherein the reactants are boric acid and zinc oxide.]

*13. The process of preparing zinc borate of the approximate formula 2ZnO·$3B_2O_3$ wherein water of hydration is present in a range of $3.3H_2O$ to $3.7H_2O$ comprising mixing boric acid with zinc oxide in the presence of zinc borate seed crystals and in the presence of an aqueous medium and maintaining a temperature of at least about 70° C. whereby the said zinc borate is precipitated.*

References Cited

The following references, cited by the Examiner, are of record in the patented file of this patent or the original patent.

UNITED STATES PATENTS

| | | | |
|---|---|---|---|
| 2,405,366 | 8/1946 | Myhren et al. | 23—59 |
| 3,126,352 | 3/1964 | Blair et al. | 23—59 |

HERBERT T. CARTER, Primary Examiner